US011323144B2

(12) United States Patent
Hong

(10) Patent No.: US 11,323,144 B2
(45) Date of Patent: May 3, 2022

(54) METHOD AND DEVICE FOR INDICATING INTER-MODULATION DISTORTION, BASE STATION, AND USER EQUIPMENT

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 84 days.

(21) Appl. No.: 16/761,257

(22) PCT Filed: Nov. 24, 2017

(86) PCT No.: PCT/CN2017/112904
§ 371 (c)(1),
(2) Date: May 3, 2020

(87) PCT Pub. No.: WO2019/100333
PCT Pub. Date: May 31, 2019

(65) Prior Publication Data
US 2020/0350937 A1 Nov. 5, 2020

(51) Int. Cl.
*H04B 1/10* (2006.01)
*H04W 28/06* (2009.01)
(Continued)

(52) U.S. Cl.
CPC ............ *H04B 1/109* (2013.01); *H04W 28/06* (2013.01); *H04W 72/0413* (2013.01); *H04W 72/0453* (2013.01); *H04W 76/27* (2018.02)

(58) Field of Classification Search
CPC ........... H04W 72/0413; H04W 72/085; H04W 76/27; H04W 76/15; H04W 72/0453; H04W 28/06; H04N 1/109
See application file for complete search history.

(56) References Cited

U.S. PATENT DOCUMENTS 7,366,470 B1   4/2008  Green et al.
2016/0227416 A1   8/2016  Suzuki et al.
(Continued)

FOREIGN PATENT DOCUMENTS

CN   101170334 A   4/2008
CN   101179310 A   5/2008
(Continued)

OTHER PUBLICATIONS

Single UL Transmission in LTE-NR Dual Connectivity(R1-1716614); 3GPP TSG-RAN WG1 NR AH #3; Nagoya, Japan, Sep. 18-21, 2017.
(Continued)

*Primary Examiner* — Brian D Nguyen
(74) *Attorney, Agent, or Firm* — Syncoda LLC; Feng Ma

(57) ABSTRACT

A method for indicating inter-modulation distortion (IMD) includes: sending a query request to user equipment (UE) when a second base station is to be configured for the UE, the query request being used for querying whether IMD will be generated for downlink reception when the UE simultaneously performs uplink transmission on a uplink frequency band combination to be configured by a first base station and the second base station; receiving a determining result fed back by the UE according to the query request; and configuring uplink transmission and downlink reception for the UE on a corresponding frequency band according to the received determining result. As such, signaling overhead of a system can be greatly reduce, and the occurrence of IMD can be avoided.

7 Claims, 5 Drawing Sheets

(51) Int. Cl.
*H04W 72/04* (2009.01)
*H04W 76/27* (2018.01)

(56) References Cited

U.S. PATENT DOCUMENTS

| | | | |
|---|---|---|---|
| 2016/0262118 A1 | 9/2016 | Kim et al. | |
| 2016/0302209 A1* | 10/2016 | Behravan | H04L 5/0066 |
| 2017/0047949 A1* | 2/2017 | Notargiacomo | H04B 1/109 |
| 2017/0181172 A1 | 6/2017 | Susitaival et al. | |
| 2017/0238163 A1 | 8/2017 | Chen | |
| 2017/0317766 A1* | 11/2017 | Vella-Coleiro | G01R 23/20 |
| 2018/0279308 A1* | 9/2018 | Kim | H04L 5/001 |
| 2020/0236696 A1* | 7/2020 | Takahashi | H04W 74/004 |
| 2020/0359398 A1* | 11/2020 | Takahashi | H04W 72/0486 |
| 2021/0235351 A1* | 7/2021 | Kim | H04W 28/08 |
| 2021/0236789 A1* | 8/2021 | Rassat | A61M 39/06 |

FOREIGN PATENT DOCUMENTS

| | | |
|---|---|---|
| CN | 102075951 A | 5/2011 |
| CN | 102257861 A | 11/2011 |
| CN | 102958061 A | 3/2013 |
| CN | 104662736 A | 5/2015 |
| CN | 107343292 A | 11/2017 |
| CN | 107925546 A | 4/2018 |

OTHER PUBLICATIONS

Discussion on the NR-LTE self-interference issue(R1-1710173); 3GPP TSG RAN WG1 NR Ad-Hoc#2; Qingdao, P.R. China Jun. 27-30, 2017.

RAN2 impact from single uplink EN-DC(R2-1711777); 3GPP TSG-RAN WG2 2017 RAN2#99bis Meeting; Prague, CZ, Oct. 9-13, 2017.

Extended European Search Report in Application No. 17932760.6, dated Nov. 2, 2020.

1st Office Action (CNOA1) in Application No. CN 201780001898.6, dated Jun. 1, 2021.

3GPP TSG-RAN WG4 Meeting #81 R4-1609011, Reno, Nevada, USA, Nov. 14-18, 2016.

Hou Fan, etc. Analysis and Treatment of Intermodulation Interference in Distributed Antenna System, Mobile Communications, Dec. 31, 2012.

* cited by examiner

METHOD AND DEVICE FOR INDICATING INTER-MODULATION DISTORTION, BASE STATION, AND USER EQUIPMENT

CROSS-REFERENCE TO RELATED APPLICATION

This application is a national stage of International Application No. PCT/CN2017/112904 filed on Nov. 24, 2017, the disclosure of which is hereby incorporated by reference in its entirety.

TECHNICAL FIELD

The present disclosure relates to the field of communication technologies, and in particular, to a method and device for indicating an inter-modulation distortion, a method and device for feeding back an inter-modulation distortion result, a base station, a user equipment and a computer-readable storage medium.

BACKGROUND

With the rapid development of wireless communication technology, 5th Generation (5G) has emerged. In the early stage of 5G layout, non-standalone (NSA) method may be used for network deployment, and the NSA method is based on dual connection of Long Term Evolution (LTE)-new radio (NR), which requires the user equipment (UE) to maintain two communication links at the same time, one is the LTE communication link, and the other is the NR communication link.

However, if the UE performs uplink transmission on two frequency bands at the same time, it may cause severe Inter-Modulation Distortion (IMD) for downlink reception in a certain frequency band, thereby reducing the performance of the UE, and this problem is particularly serious for LTE frequency bands and NR frequency bands below 6 GHz.

Therefore, if the UE can report its IMD problem on certain frequency band combinations to the base station, then the base station can avoid configuring an uplink combination that may cause inter-modulation distortion problems for the UE. However, if the UE capability reporting method is adopted to enable the UE to report its capabilities to the base station, the UE needs to report all the frequency band combinations which can be supported by itself during the attach stage, which will cause a large signaling overhead.

SUMMARY

In view of this, the present application discloses a method and device for indicating an inter-modulation distortion, a method and device for feeding back an inter-modulation distortion result, a base station, a user equipment, and a computer-readable storage medium for reducing signaling overhead.

According to a first aspect of the embodiments of the present disclosure, there is provided a method for indicating an inter-modulation distortion, which is applied to a first base station, and the method including:

when preparing to configure a second base station for a user equipment (UE), sending a query request to the UE, wherein the query request is configured to query the UE whether an inter-modulation distortion (IMD) will be generated on downlink reception when performing uplink transmission on an uplink frequency band combination to be configured by the first base station and the second base station simultaneously;

receiving a determination result fed back by the UE according to the query request; and configuring uplink transmission and downlink reception for the UE on a corresponding frequency band according to the received determination result.

In an embodiment, the configuring uplink transmission and downlink reception for the UE on the corresponding frequency band according to the received determination result includes:

if the received determination result is information of a frequency band on which the IMD is generated, then configuring uplink transmission and downlink reception for the UE on other frequency band except the frequency band on which the IMD is generated; and if the received determination result is that no IMD will be generated on downlink reception when the UE performs uplink transmission on the uplink frequency band combination simultaneously, then configuring uplink transmission and downlink reception for the UE on the uplink frequency band combination.

In an embodiment, the method further includes:

before configuring the uplink transmission and downlink reception for the UE on other frequency band except the frequency band on which the IMD is generated, repeatedly executing the sending the query request to the UE and the receiving the determination result fed back by the UE according to the query request until the determination result is that no IMD will be generated on downlink reception when the UE performs uplink transmission on the uplink frequency band combination simultaneously, wherein the uplink frequency band combination comprises said other frequency band. In an embodiment, the sending the query request to the UE includes:

sending the query request to the UE through new radio resource control (RRC) signaling.

According to a second aspect of the embodiments of the present disclosure, there is provided a method for feeding back an inter-modulation distortion result, which is applied to a user equipment (UE), the method including:

receiving a query request sent by a first base station when the first base station is preparing to configure a second base station for the UE, wherein the query request is configured to query the UE whether an inter-modulation distortion will be generated on downlink reception when performing uplink transmission on an uplink frequency band combination to be configured by the first base station and the second base station simultaneously;

determining whether the inter-modulation distortion will be generated on downlink reception when the UE performs uplink transmission on the uplink frequency band combination to be configured by the first base station and the second base station according to the query request; and feeding back a determination result to the first base station.

In an embodiment, the feeding back the determination result to the first base station includes:

feeding back the determination result to the first base station through new radio resource control (RRC) signaling.

According to a third aspect of the embodiments of the present disclosure, there is provided a device for indicating an inter-modulation distortion, which is applied to a first base station, the device including:

a sending module configured to, when preparing to configure a second base station for a user equipment (UE), send a query request to the UE, wherein the query request is configured to query the UE whether an inter-modulation distortion (IMD) will be generated on downlink reception when performing uplink transmission on an uplink frequency band combination to be configured by the first base station and the second base station simultaneously;

a receiving module configured to receive a determination result fed back by the UE according to the query request sent by the sending module; and a configuration module configured to configure uplink transmission and downlink reception for the UE on a corresponding frequency band according to the determination result received by the receiving module.

In an embodiment, the configuration module includes:

a first configuration unit configured to, if the determination result received by the receiving module is information of a frequency band on which the IMD is generated, then configure uplink transmission and downlink reception for the UE on other frequency band except the frequency band on which the IMD is generated; and a second configuration unit configured to, if the determination result received by the receiving module is that no IMD will be generated on downlink reception when the UE performs uplink transmission on the uplink frequency band combination simultaneously, then configure uplink transmission and downlink reception for the UE on the uplink frequency band combination.

In an embodiment, the first configuration unit is further configured to, before configuring the uplink transmission and downlink reception for the UE on other frequency band except the frequency band on which the IMD is generated, repeatedly call the sending module to execute the sending the query request to the UE and the receiving module to execute the receiving the determination result fed back by the UE according to the query request until the determination result is that no IMD will be generated on downlink reception when the UE performs uplink transmission on the uplink frequency band combination simultaneously, wherein the uplink frequency band combination comprises said other frequency bands.

In an embodiment, the sending module is configured to:
send the query request to the UE through new radio resource control (RRC) signaling.

According to a fourth aspect of the embodiments of the present disclosure, there is provided a device for feeding back an inter-modulation distortion result, which is applied to user equipment (UE), the device including:

a receiving module configured to receive a query request sent by a first base station when it is preparing to configure a second base station for the UE, wherein the query request is configured to query the UE whether an inter-modulation distortion will be generated on downlink reception when performing uplink transmission on an uplink frequency band combination to be configured by the first base station and the second base station simultaneously;

a determining module configured to determine whether the inter-modulation distortion will be generated on downlink reception when the UE performs uplink transmission on the uplink frequency band combination to be configured by the first base station and the second base station according to the query request received by the receiving module; and a feedback module configured to feed back a determination result of the determining module to the first base station.

In an embodiment, the feedback module is configured to:
feed back the determination result to the first base station through new radio resource control (RRC) signaling.

According to a fifth aspect of the embodiments of the present disclosure, there is provided a base station, including:

a processor; and
a memory for storing instructions executable by the processor;
wherein the processor is configured to:
when preparing to configure a second base station for a user equipment (UE), send a query request to the UE, wherein the query request is configured to query the UE whether an inter-modulation distortion (IMD) will be generated on downlink reception when performing uplink transmission on an uplink frequency band combination to be configured by the first base station and the second base station simultaneously;

receive a determination result fed back by the UE according to the query request; and configure uplink transmission and downlink reception for the UE on a corresponding frequency band according to the received determination result.

According to a sixth aspect of the embodiments of the present disclosure, there is provided a user equipment, including:

a processor; and
a memory for storing instructions executable by the processor;
wherein the processor is configured to:
receive a query request sent by a first base station when it is preparing to configure a second base station for the UE, wherein the query request is configured to query the UE whether an inter-modulation distortion will be generated on downlink reception when performing uplink transmission on an uplink frequency band combination to be configured by the first base station and the second base station simultaneously;

determine whether the inter-modulation distortion will be generated on downlink reception when the UE performs uplink transmission on the uplink frequency band combination to be configured by the first base station and the second base station according to the query request; and feed back a determination result to the first base station.

According to a seventh aspect of the embodiments of the present disclosure, there is provided a computer-readable storage medium having computer instructions stored thereon, wherein when the instructions are executed by a processor, the steps of the above-mentioned method for indicating an inter-modulation distortion are implemented.

According to an eighth aspect of the embodiments of the present disclosure, there is provided a computer-readable storage medium having computer instructions stored thereon, wherein when the instructions are executed by a processor, the steps of the above-mentioned method for feeding back an inter-modulation distortion result are implemented.

The technical solutions provided by the embodiments of the present disclosure may include the following beneficial effects.

The query request is sent to the UE when preparing to configure a second base station for the UE, to query the UE whether an IMD will be generated on downlink reception when performing uplink transmission on an uplink frequency band combination to be configured by the first base station and the second base station simultaneously, and uplink transmission and downlink reception is configured for the UE on a corresponding frequency band according to the received determination result. Because the UE feeds back the determination result according to the query request, the system signaling overhead can be greatly saved, and inter-modulation distortion can be avoided.

By determining whether an IMD will be generated on downlink reception when the UE performs uplink transmission on an uplink frequency band combination to be configured by the first base station and the second base station simultaneously according to the received query request, and feeding back the determination result to the first base station, the system signaling overhead can be greatly saved.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
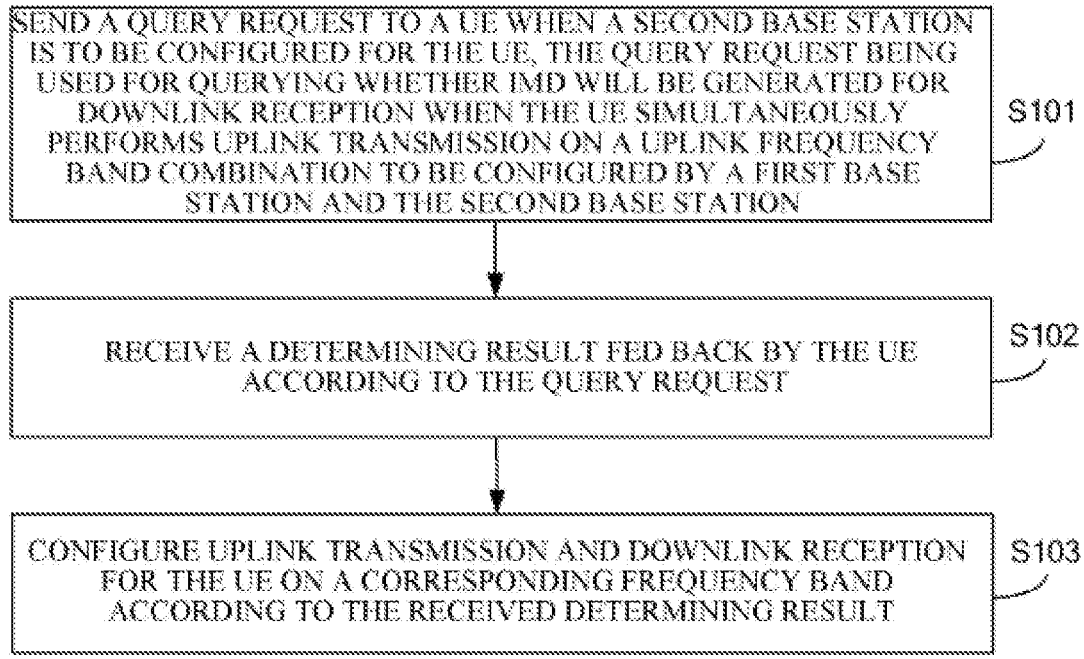
FIG. 1 is a flowchart of a method for indicating an inter-modulation distortion according to an exemplary embodiment of the present application.

FIG. 1 is a flowchart illustrating a method for indicating an inter-modulation distortion according to an exemplary embodiment of the present application. This embodiment is described from a first base station side. As shown in FIG. 1, the method for indicating an inter-modulation distortion includes the following steps.

In step S101, when preparing to configure a second base station for the UE, a query request is sent to the UE, where the query request is configured to query the UE whether an inter-modulation distortion (IMD) will be generated on downlink reception when performing uplink transmission on an uplink frequency band combination to be configured by the first base station and the second base station simultaneously.

The first base station may be an LTE base station, the second base station may be a 5G base station (gNB), and the uplink frequency band combination includes an uplink frequency band corresponding to the first base station and an uplink frequency band corresponding to the second base station. The first base station may select one uplink frequency band corresponding to the second base station according to a load, or may randomly select one uplink frequency band from uplink frequency bands that can be used by the second base station.

In this embodiment, when an LTE base station prepares to configure a gNB as a secondary base station for a 5G UE, it can send a query request to the UE through new radio resource control (RRC) signaling to query the 5G UE whether an inter-modulation distortion (IMD) will be generated on downlink reception when performing uplink transmission on an uplink frequency band combination to be configured by the first base station and the second base station simultaneously.

The frequency band corresponding to downlink reception is a downlink frequency band corresponding to any uplink frequency band in the uplink frequency band combination.

In step S102, a determination result fed back by the UE according to the query request is received.

After receiving the query request, the UE can determine whether an inter-modulation distortion will be generated on downlink reception when performing uplink transmission on an uplink frequency band combination to be configured by the first base station and the second base station simultaneously according to its actual implementation condition. If the inter-modulation distortion will be generated to the downlink reception when performing uplink transmission on some frequency band combinations, the UE may feed back information of the frequency band on which the inter-modulation distortion is generated to the base station through new RRC signaling. If no inter-modulation distortion will be generated to the downlink reception when performing uplink transmission on some frequency band combinations, the UE may feed back to the base station through new RRC signaling that no inter-modulation distortion will occur.

In step S103, uplink transmission and downlink reception are configured for the UE on a corresponding frequency band according to the received determination result.

In this embodiment, if the determination result received by the first base station is information of the frequency band on which the IMD will be generated, the UE may be configured with uplink transmission and downlink reception on other frequency bands than the frequency band on which the IMD will be generated, that is, it is avoided to configure a frequency band on which the inter-modulation distortion will be generated for the UE, thereby eliminating the IMD and improving the performance of the UE. If the determination result received by the first base station is that no IMD will be generated to the downlink reception when the UE performs uplink transmission in the uplink frequency band combination at the same time, then the UE may be configured with uplink transmission and downlink reception on the uplink frequency band combination.

For example, if the determination result received by the LTE base station is that an uplink frequency band 1 of LTE and an uplink frequency band 2 of NR are the frequency bands on which the IMD will be generated, it is not possible to configure uplink transmission for the UE in the uplink frequency band 1 of LTE and the uplink frequency band 2 of NR at the same time. If the determination result received by the LTE base station is that no IMD will be generated for downlink reception when the UE performs uplink transmission on the uplink frequency band 1 and the uplink frequency band 2 of NR at the same time, then uplink transmission can be configured for the UE on both uplink frequency band 1 and uplink frequency band 2 of NR.

It should be noted that, in one embodiment, before the first base station configures uplink transmission and downlink reception for the UE on a frequency band other than the frequency band in which the IMD is generated, it is necessary to repeatedly perform sending the query request to the UE and receiving the determination result fed back by the query request until the determination result is that no IMD will be generated for downlink reception when the UE performs uplink transmission on the uplink frequency band combination at the same time. In this way, the IMD can be avoided. The uplink frequency band combination includes other frequency bands.

In the foregoing embodiment, when preparing to configure a second base station for the UE, a query request is sent to the UE to query whether an IMD will be generated on downlink reception when performing uplink transmission on an uplink frequency band combination to be configured by the first base station and the second base station simultaneously, and uplink transmission and downlink reception are configured for the UE in the corresponding frequency band according to the determination result fed back by the UE. Because the UE feeds back the determination result according to the query request, the system signaling overhead can be greatly saved, and the inter-modulation distortion can be avoided.

Figure 2:
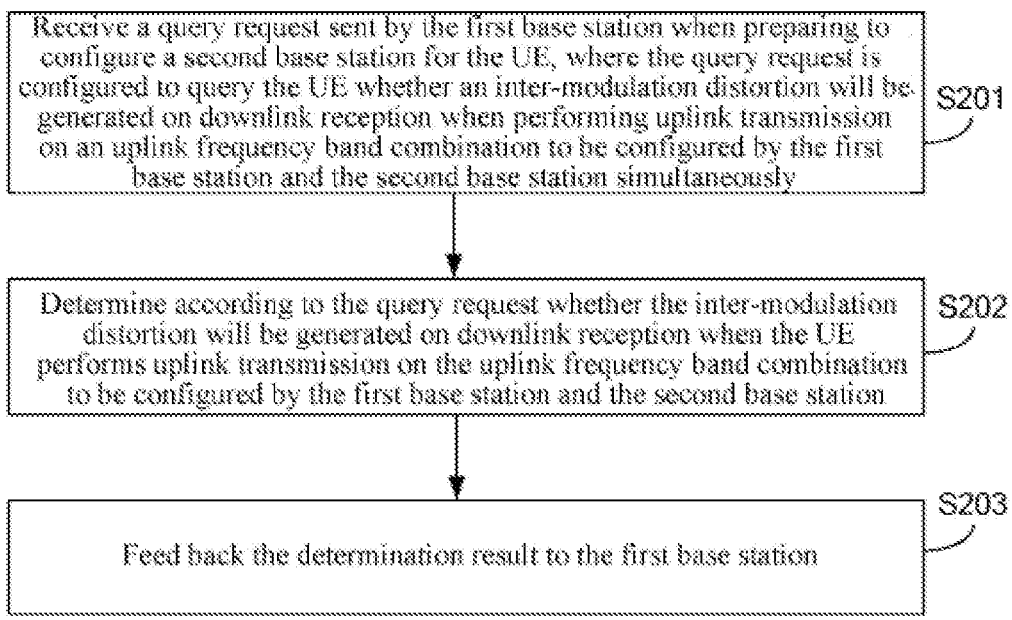
FIG. 2 is a flowchart of a method for feeding back an inter-modulation distortion result according to an exemplary embodiment of the present application.

FIG. 2 is a flowchart of a method for feeding back an inter-modulation distortion result according to an exemplary embodiment of the present application. This embodiment is described from the UE side. As shown in FIG. 2, the method for feeding back an inter-modulation distortion result includes the following steps.

In step S201, a query request sent by the first base station when it is preparing to configure a second base station for the UE is received, where the query request is configured to query the UE whether an inter-modulation distortion will be generated on downlink reception when performing uplink transmission on an uplink frequency band combination to be configured by the first base station and the second base station simultaneously.

The first base station may be an LTE base station, and the second base station may be a 5G base station (gNB). For example, when the LTE base station prepares to configure the gNB as a secondary base station for the 5G UE, it may send a query request to the UE through new RRC signaling, and the UE receives the query request.

In step S202, it is determined according to the query request whether the inter-modulation distortion will be generated on downlink reception when the UE performs uplink transmission on the uplink frequency band combination to be configured by the first base station and the second base station.

After receiving the query request, the UE may determine whether the inter-modulation distortion will be generated on downlink reception when the UE performs uplink transmission on the uplink frequency band combination to be configured by the first base station and the second base station according to its actual implementation condition.

In this embodiment, the UE may calculate an IMD lower limit and an IMD upper limit according to the information of two uplink frequency bands in the uplink frequency band combination. If the frequency band where the downlink reception is located is within a frequency band interval constituted by the IMD lower limit and the IMD upper limit, then it may be determined that the inter-modulation distortion will be generated on the downlink reception when performing uplink transmission on the uplink frequency band combination at the same time. Otherwise, it can be determined that no inter-modulation distortion will be generated on the downlink reception when performing uplink transmission in the uplink frequency band combination.

For example, the uplink frequency band combination is: uplink frequency band 1800-1810 and uplink frequency band 3640-3660, then when the UE simultaneously performs uplink transmission in the uplink frequency band combination, the generated IMD lower limit (IM2_low) is 3640−1810=1830, and the generated IMD upper limit (IM2_high) is 3660−1800=1860. It is assumed that the downlink frequency band corresponding to the uplink frequency band 1800-1810 is 1850-1860, since 1850-1860 is located within 1830-1860, the IMD interference will be generated to the downlink reception when the UE performs sending on both uplink frequency bands at the same time.

In step S203, the determination result is fed back to the first base station.

The UE may feed back the determination result to the first base station through new RRC signaling.

In this embodiment, if uplink transmission on certain frequency band combinations may cause inter-modulation distortion to downlink reception, the UE may feed back information of the frequency band on which the inter-modulation distortion is generated to the base station through new RRC signaling. If the uplink transmission on certain frequency band combinations does not cause inter-modulation distortion to the downlink reception, the UE may feed back to the base station through new RRC signaling that no inter-modulation distortion will occur.

In the above embodiment, it is determined whether the inter-modulation distortion will be generated on downlink reception when the UE simultaneously performs uplink transmission in the uplink frequency band combination to be configured by the first base station and the second base station according to the received query request, and the determination result is fed back to the first base station, which can greatly save system signaling overhead.

Figure 3:
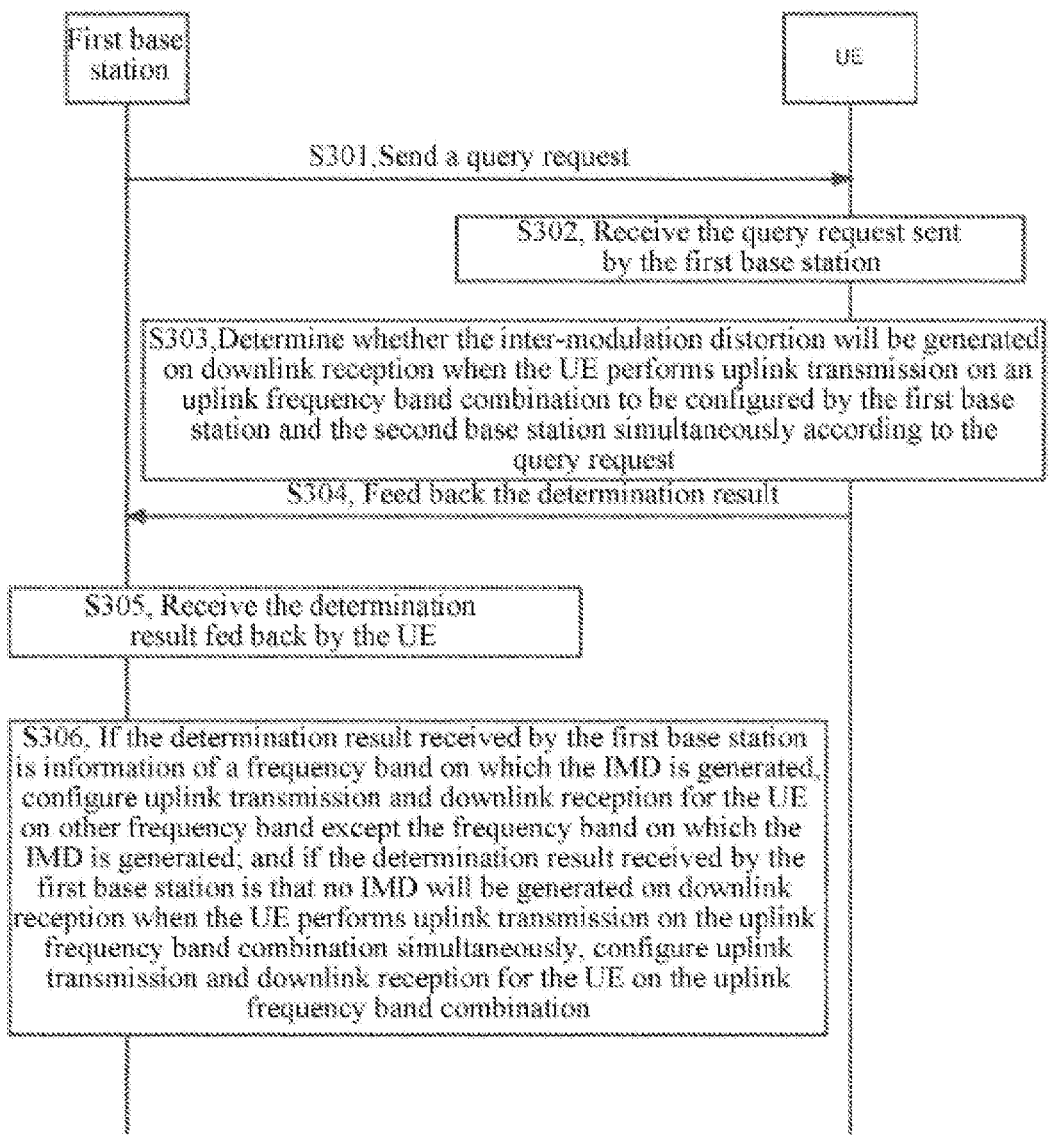
FIG. 3 is a signaling flowchart of a method for feeding back an inter-modulation distortion result according to an exemplary embodiment of the present application.

FIG. 3 is a signaling flowchart of a method for feeding back an inter-modulation distortion result according to an exemplary embodiment of the present application. This embodiment is described from the perspective of interaction between a UE and a base station. As shown in FIG. 3, the method for feeding back an inter-modulation distortion result includes the following steps.

In step S301, when preparing to configure a second base station for the user equipment (UE), the first base station sends a query request to the UE, and the query request is configured to query the UE whether an inter-modulation distortion (IMD) will be generated on downlink reception when performing uplink transmission on an uplink frequency band combination to be configured by the first base station and the second base station simultaneously.

In step S302, the UE receives the query request sent by the first base station.

In step S303, the UE determines whether the inter-modulation distortion will be generated on downlink reception when the UE performs uplink transmission on an uplink frequency band combination to be configured by the first base station and the second base station simultaneously according to the query request.

In step S304, the UE feeds back the determination result to the first base station.

In step S305, the first base station receives the determination result fed back by the UE.

In step S306, if the determination result received by the first base station is information of a frequency band on which the IMD is generated, uplink transmission and downlink reception are configured for the UE on other frequency band except the frequency band on which the IMD is generated; and if the determination result received by the first base station is that no IMD will be generated on downlink reception when the UE performs uplink transmission on the uplink frequency band combination simultaneously, uplink transmission and downlink reception may be configured for the UE on the uplink frequency band combination.

In the foregoing embodiment, the interaction between the base station and the UE enables the UE to feed back the determination result according to the query request sent by the base station, thereby greatly saving system signaling overhead, and enabling the base station to configure uplink transmission and downlink reception for the UE in the corresponding frequency band according to the determination result fed back by the UE, thereby avoiding the inter-modulation distortion.

Figure 4:
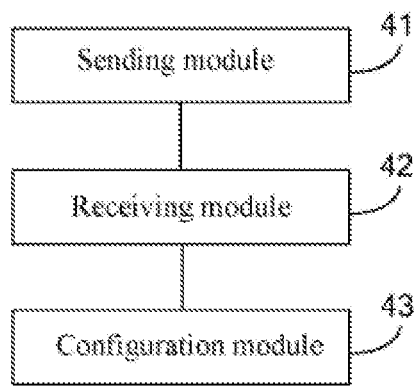
FIG. 4 is a block diagram of a device for indicating an inter-modulation distortion according to an exemplary embodiment.

FIG. 4 is a block diagram of a device for indicating an inter-modulation distortion according to an exemplary embodiment. The device may be located in a base station. As shown in FIG. 4, the device includes a sending module 41, a receiving module 42, and a configuration module 43.

The sending module 41 is configured to send a query request to the UE when preparing to configure a second base station for the user equipment (UE). The query request is configured to query the UE whether an inter-modulation distortion will be generated on downlink reception when performing uplink transmission on an uplink frequency band combination to be configured by the first base station and the second base station simultaneously.

The first base station may be an LTE base station, and the second base station may be a 5G base station (gNB). The uplink frequency band combination includes an uplink frequency band corresponding to the first base station and an uplink frequency band corresponding to the second base station. The first base station may select one uplink frequency band corresponding to the second base station according to a load, or may randomly select one uplink frequency band from the uplink frequency bands that can be used by the second base station.

In this embodiment, when an LTE base station prepares to configure a gNB as a secondary base station for a 5G UE, it can send a query request to the UE through new radio resource control (RRC) signaling to query the 5G UE whether an inter-modulation distortion will be generated on downlink reception when performing uplink transmission on an uplink frequency band combination to be configured by the first base station and the second base station simultaneously.

The frequency band corresponding to downlink reception is the downlink frequency band corresponding to any uplink frequency band in the uplink frequency band combination. The receiving module 42 is configured to receive a determination result fed back by the UE according to the query request sent by the sending module 41.

After receiving the query request, the UE can determine whether an inter-modulation distortion will be generated on downlink reception when performing uplink transmission on an uplink frequency band combination to be configured by the first base station and the second base station simultaneously according to its actual implementation situation. If the uplink transmission on certain frequency band combinations will cause inter-modulation distortion to the downlink reception, the UE can feed back information of the frequency band on which the inter-modulation distortion is generated to the base station through new RRC signaling. If the uplink transmission on certain frequency band combinations does not cause inter-modulation distortion to the downlink reception, the UE can feed back to the base station through new RRC signaling that no inter-modulation distortion will occur.

The configuration module 43 is configured to configure uplink transmission and downlink reception for the UE on a corresponding frequency band according to the determination result received by the receiving module 42.

In this embodiment, if the determination result received by the first base station is information of a frequency band on which the IMD is generated, the UE may be configured with uplink transmission and downlink reception on other frequency band than the frequency band on which the IMD is generated, that is, it is avoided to configure for the UE the frequency band on which the inter-modulation distortion will occur, thereby eliminating the IMD and improving the performance of the UE. If the determination result received by the first base station is that no IMD will be generated for downlink reception when the UE performs uplink transmission in the uplink frequency band combination at the same time, the UE may be configured with uplink transmission and downlink reception on the uplink frequency band combination.

In the above embodiment, when preparing to configure a second base station for the UE, a query request is sent to the UE to query whether an inter-modulation distortion will be generated on downlink reception when performing uplink transmission on an uplink frequency band combination to be configured by the first base station and the second base station simultaneously, and uplink transmission and downlink reception are configured for the UE in the corresponding frequency band according to the determination result fed back by the UE. Because the UE feeds back the determination result according to the query request, the system signaling overhead can be greatly saved, and the inter-modulation distortion can be avoided.

Figure 5:
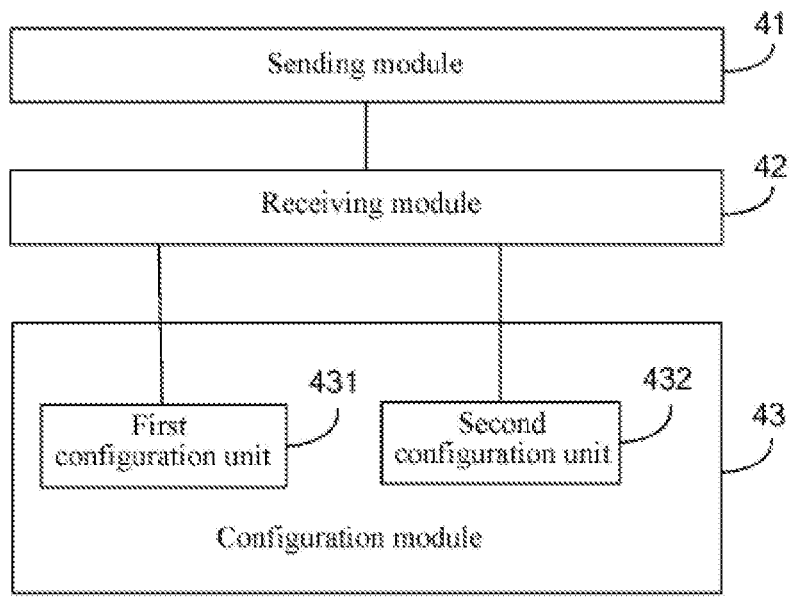
FIG. 5 is a block diagram of another device for indicating an inter-modulation distortion according to an exemplary embodiment.

FIG. 5 is a block diagram of another device for indicating an inter-modulation distortion according to an exemplary embodiment. As shown in FIG. 5, based on the embodiment shown in FIG. 4 described above, the configuration module 43 may include: a first configuration unit 431 and a second configuration unit 432.

The first configuration unit 431 is configured to, if the determination result received by the receiving module 42 is information of a frequency band on which the IMD is generated, then configure uplink transmission and downlink reception for the UE on other frequency band except the frequency band on which the IMD is generated.

The second configuration unit 432 is configured to, if the determination result received by the receiving module 42 is that no IMD will be generated on downlink reception when the UE performs uplink transmission on the uplink frequency band combination simultaneously, then configure uplink transmission and downlink reception for the UE on the uplink frequency band combination.

For example, if the determination result received by the LTE base station is that the LTE uplink frequency band 1 and the NR uplink frequency band 2 are frequency bands on which the IMD will be generated, it is not possible to configure uplink transmission for the UE in the LTE uplink frequency band 1 and the NR uplink frequency band 2 at the same time. If the determination result received by the LTE base station is that no IMD will be generated for downlink reception when the UE performs uplink transmission on uplink frequency band 1 and NR uplink frequency band 2 at the same time, uplink transmission can be configured for the UE on both uplink frequency band 1 and NR uplink frequency band 2.

In addition, the first configuration unit 431 may also be configured to, before configuring the uplink transmission and downlink reception for the UE on other frequency band except the frequency band on which the IMD is generated, repeatedly call the sending module 41 to execute the sending the query request to the UE and the receiving module 42 to execute the receiving the determination result fed back by the UE according to the query request until the determination result is that no IMD will be generated on downlink reception when the UE performs uplink transmission on the uplink frequency band combination simultaneously, where the uplink frequency band combination includes the other frequency bands.

In the foregoing embodiment, when the determination result is information of a frequency band on which the IMD is generated, the UE is configured with uplink transmission and downlink reception on other frequency band than the frequency band on which the IMD is generated, that is, it is avoided to configure for the UE the frequency band on which the inter-modulation may be generated, thereby eliminating the IMD. When the received determination result is that no IMD will be generated for downlink reception when the UE performs uplink transmission on the uplink frequency band combination at the same time, uplink transmission and downlink reception are configured for the UE on the uplink frequency band combination, that is, no IMD will be generated when uplink transmission is performed on the uplink frequency band combination at the same time.

Figure 6:
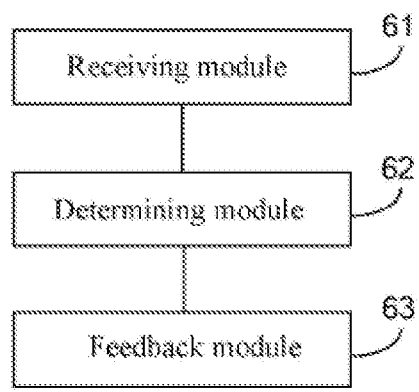
FIG. 6 is a block diagram of a device for feeding back an inter-modulation distortion result according to an exemplary embodiment.

FIG. 6 is a block diagram of a device for feeding back an inter-modulation distortion result according to an exemplary embodiment. The device may be located in a UE. As shown in FIG. 6, the device includes a receiving module 61, a determining module 62, and a feedback module 63.

The receiving module 61 is configured to receive a query request sent by the first base station when the first base station is preparing to configure a second base station for the UE, and the query request is configured to query the UE whether an inter-modulation distortion will be generated on downlink reception when performing uplink transmission on an uplink frequency band combination to be configured by the first base station and the second base station simultaneously.

The first base station may be an LTE base station, and the second base station may be a 5G base station (gNB). For example, when the LTE base station prepares to configure the gNB as a secondary base station for the 5G UE, it may send a query request to the UE through new RRC signaling, and the UE receives the query request.

The determination module 62 is configured to determine whether the inter-modulation distortion will be generated on downlink reception when the UE performs uplink transmission on the uplink frequency band combination to be configured by the first base station and the second base station according to the query request received by the receiving module 61.

After receiving the query request, the UE can determine whether the inter-modulation distortion will be generated on downlink reception when the UE performs uplink transmission on the uplink frequency band combination to be configured by the first base station and the second base station according to its actual implementation situation.

In this embodiment, the UE may calculate the IMD lower limit and the IMD upper limit according to the information of two uplink frequency bands in the uplink frequency band combination. If the frequency band in which the downlink reception is located is in a frequency band interval formed by the IMD lower limit and the IMD upper limit, it may be determined that the inter-modulation distortion will be generated on the downlink reception when uplink transmission is performed in the uplink frequency band combination. Otherwise, it can be determined that when uplink transmission is performed in the uplink frequency band combination, no inter-modulation distortion will be generated on the downlink reception.

For example, the uplink frequency band combination is: uplink frequency band 1800-1810 and uplink frequency band 3640-3660, and the UE simultaneously performs uplink transmission in the uplink frequency band combination, resulting in an IMD lower limit (IM2_low) of 3640−1810=1830, resulting in an IMD upper limit (IM2_high) of 3660−1800=1860. It is assumed that the downlink frequency band is 1850-1860, since 1850-1860 is located in 1830-1860, the UE transmitting in these two uplink frequency bands will cause IMD interference to downlink reception.

The feedback module 63 is configured to feed back the determination result of the determination module 62 to the first base station.

The UE may feed back the determination result to the first base station through new RRC signaling.

In this embodiment, if uplink transmission on certain frequency band combinations may cause inter-modulation distortion to downlink reception, the UE may feed back information of a frequency band on which inter-modulation distortion will be generated to the base station through new RRC signaling. If the uplink transmission on certain frequency band combinations does not cause inter-modulation distortion to the downlink reception, the UE can feed back to the base station through new RRC signaling that no inter-modulation distortion will occur.

In the above embodiment, it is determined whether an inter-modulation distortion will be generated on downlink reception when performing uplink transmission on an uplink frequency band combination to be configured by the first base station and the second base station simultaneously according to the received query request, and the determination result is fed back to the first base station, which can greatly save system signaling overhead.

Figure 7:
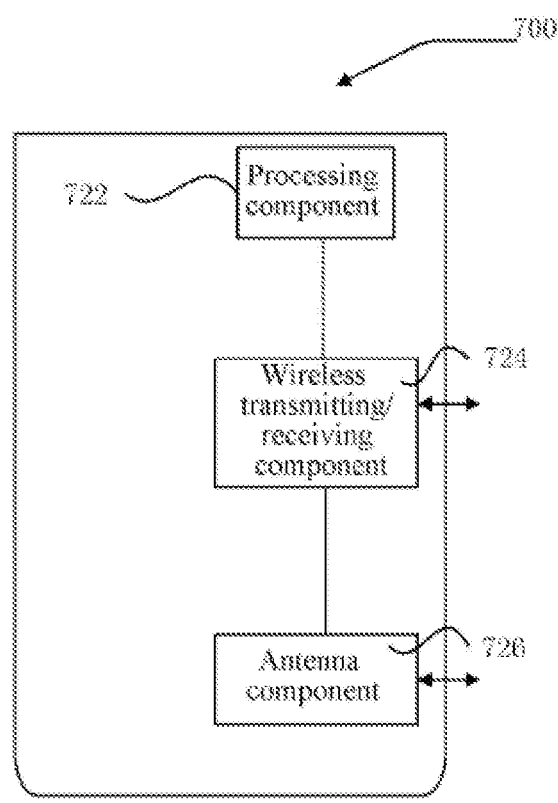
FIG. 7 is a block diagram of a device for indicating an inter-modulation distortion according to an exemplary embodiment.

FIG. 7 is a block diagram of a device for indicating an inter-modulation distortion according to an exemplary embodiment. The device 700 may be provided as a base station. Referring to FIG. 7, the device 700 includes a processing component 722, a wireless transmitting/receiving component 724, an antenna component 726, and a signal processing portion unique to a wireless interface. The processing component 722 may further include one or more processors.

One of the processors in the processing component 722 may be configured to:

when preparing to configure a second base station for a user equipment (UE), send a query request to the UE, where the query request is configured to query the UE whether an inter-modulation distortion (IMD) will be generated on downlink reception when performing uplink transmission on an uplink frequency band combination to be configured by the first base station and the second base station simultaneously;

receive a determination result fed back by the UE according to the query request; and configure uplink transmission and downlink reception for the UE on a corresponding frequency band according to the received determination result.

In an exemplary embodiment, there is provided a non-transitory computer-readable storage medium including instructions, which can be executed by the processing component 722 of the device 700 to complete the method of the device for indicating an inter-modulation distortion described above. For example, the non-transitory computer-readable storage medium may be a ROM, a random-access memory (RAM), a CD-ROM, a magnetic tape, a floppy disk, an optical data storage device, and the like.

Figure 8:
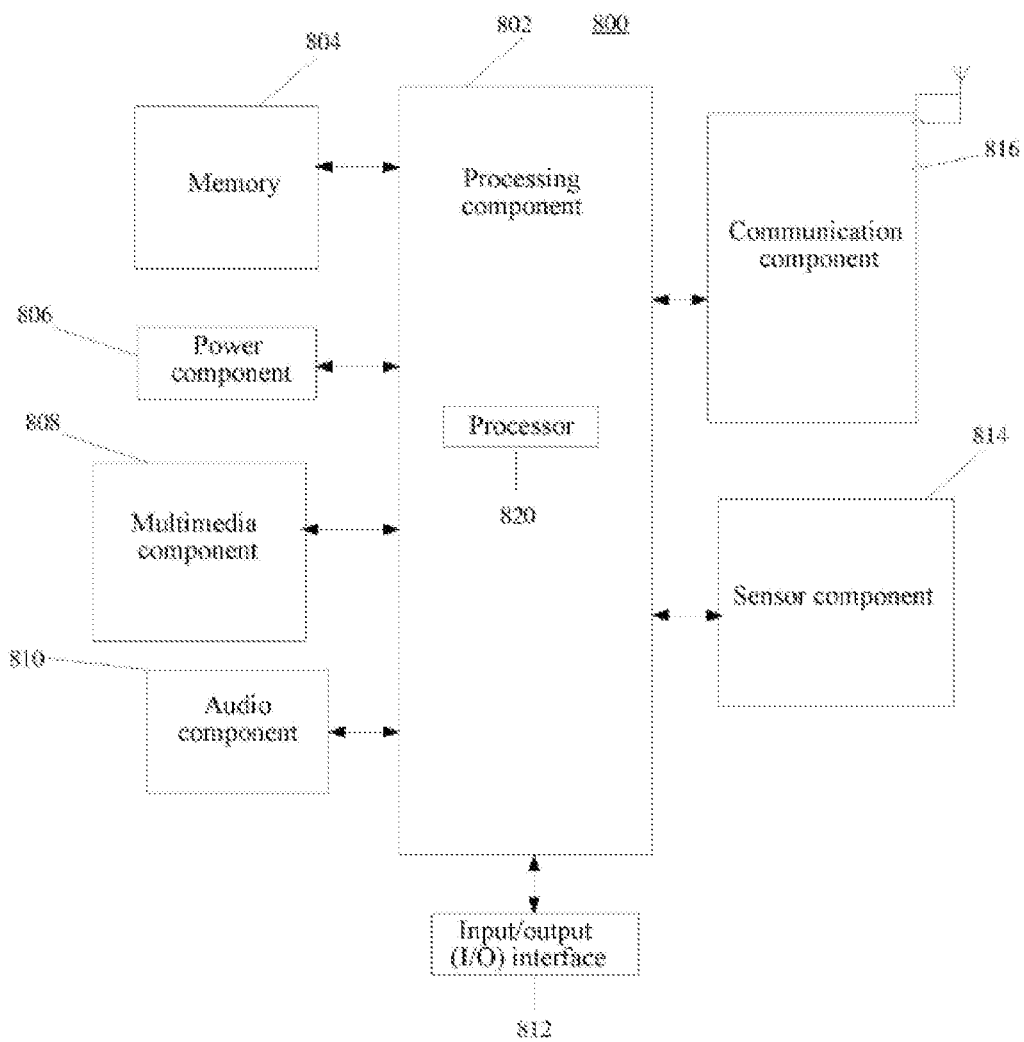
FIG. 8 is a block diagram of a device for feeding back an inter-modulation distortion result according to an exemplary embodiment.

FIG. 8 is a block diagram illustrating a device for feeding back an inter-modulation distortion result according to an exemplary embodiment. For example, the device 800 may be a mobile phone, a computer, a digital broadcast terminal, a messaging apparatus, a gaming console, a tablet, a medical apparatus, exercise equipment, a personal digital assistant, and other user equipment.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

One processor 820 in the processing component 802 may be configured to:

receive a query request sent by a first base station when the first base station is preparing to configure a second base station for the UE, wherein the query request is configured to query the UE whether an inter-modulation distortion will be generated on downlink reception when performing uplink transmission on an uplink frequency band combination to be configured by the first base station and the second base station simultaneously;

determine whether the inter-modulation distortion will be generated on downlink reception when the UE performs uplink transmission on the uplink frequency band combination to be configured by the first base station and the second base station according to the query request; and feed back a determination result to the first base station The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other apparatus. The device 800 may access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions, the above instructions may be executed by the processor 820 in the device 800 for performing the above-described methods. For example, the non-transitory computer-readable storage medium may be a ROM, a Random Access Memory (RAM), a CD-ROM, a magnetic tape, a floppy disc, an optical data storage device, and the like.

As for the device embodiments, since they basically correspond to the method embodiments, the relevant contents may refer to the description of the method embodiments. The device embodiments described above are only schematic, in which the units described as separate components may or may not be physically separated, and the components shown as units may or may not be physical units, that is, they may be located in one place, or may be distributed in multiple network elements. Some or all of the modules can be selected according to actual needs to achieve the objectives of the solutions of the present disclosure. Those of ordinary skill in the art can understand and implement them without creative efforts.

It should be noted that in the present disclosure, relational terms such as first and second are only used to distinguish one entity or operation from another entity or operation, and do not necessarily require or imply there is any such actual relationship or order among these entities or operations. The term "comprising", "including" or any other variation thereof, is intended to encompass non-exclusive inclusion such that a process, method, article, or device that includes a series of elements includes not only those elements but also other elements not definitely listed, or elements that are inherent to such process, method, article, or device. Without more restrictions, the elements defined by the sentence "including a . . . " do not exclude the existence of other identical elements in the process, method, article or device including the elements.

Other embodiments of the present disclosure will be apparent to those skilled in the art from consideration of the specification and practice of the disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

The invention claimed is:

1. A method for indicating an inter-modulation distortion, applying to a first base station, the method comprising:
   when preparing to configure a second base station for user equipment (UE), sending a query request to the UE, wherein the query request is configured to query the UE whether an inter-modulation distortion (IMD) will be generated on downlink reception when performing uplink transmission on an uplink frequency band combination to be configured by the first base station and the second base station simultaneously;
   receiving a determination result fed back by the UE according to the query request; and
   configuring uplink transmission and downlink reception for the UE on a corresponding frequency band according to the received determination result; wherein the configuring uplink transmission and downlink reception for the UE on the corresponding frequency band according to the received determination result comprises:
      when the received determination result is information of a frequency band on which the IMD is generated, configuring uplink transmission and downlink reception for the UE on other frequency band except the frequency band on which the IMD is generated; and
      when the received determination result is that no IMD will be generated on downlink reception when the UE performs uplink transmission on the uplink frequency band combination simultaneously, configure uplink transmission and downlink reception for the UE on the uplink frequency band combination;
   wherein the method further comprises:
   before configuring the uplink transmission and downlink reception for the UE on other frequency band except the frequency band on which the IMD is generated, repeatedly executing the sending the query request to the UE and receiving the determination result fed back by the UE according to the query request until the determination result is that no IMD will be generated on downlink reception when the UE performs uplink transmission on the uplink frequency band combination simultaneously, wherein the uplink frequency band combination comprises said other frequency band.

2. The method according to claim 1, wherein the sending the query request to the UE comprises:
   sending the query request to the UE through new radio resource control (RRC) signaling.

3. A communication system implementing the method according to claim 1, comprising the first base station and the UE, wherein the UE is configured to feed back the determination result according to the query request, to thereby reduce signaling overhead of the communication system, and avoid the IMD.

4. The communication system according to claim 3, wherein the system is configured to determine whether the IMD will be generated on downlink reception when the UE performs uplink transmission on the uplink frequency band combination to be configured by the first base station and the second base station simultaneously according to the received query request, and feed back the determination result to the first base station, to thereby reduce the signaling overhead.

5. The communication system according to claim 4, wherein the UE is further configured to feed back the determination result to the first base station through new radio resource control (RRC) signaling.

6. A base station, comprising:

a processor; and memory storing instructions executable by the processor;

wherein the processor is configured to:

when preparing to configure a second base station for user equipment (UE), send a query request to the UE, wherein the query request is configured to query the UE whether an inter-modulation distortion (IMD) will be generated on downlink reception when performing uplink transmission on an uplink frequency band combination to be configured by the base station and the second base station simultaneously;

receive a determination result fed back by the UE according to the query request; and configure uplink transmission and downlink reception for the UE on a corresponding frequency band according to the received determination result;

wherein the processor is further configured to:

when the determination result received is information of a frequency band on which the IMD is generated, configure uplink transmission and downlink reception for the UE on other frequency band except the frequency band on which the IMD is generated; and when the determination result received is that no IMD will be generated on downlink reception when the UE performs uplink transmission on the uplink frequency band combination simultaneously, configure uplink transmission and downlink reception for the UE on the uplink frequency band combination; and wherein the processor is further configured to:

prior to the configuring the uplink transmission and downlink reception for the UE on other frequency band except the frequency band on which the IMD is generated, repeatedly execute the sending the query request to the UE and execute the receiving the determination result fed back by the UE according to the query request until the determination result is that no IMD will be generated on downlink reception when the UE performs uplink transmission on the uplink frequency band combination simultaneously, wherein the uplink frequency band combination comprises said other frequency bands.

7. The base station according to claim 6, wherein the processor is further configured to:

send the query request to the UE through new radio resource control (RRC) signaling.

* * * * *